United States Patent Office 3,567,743
Patented Mar. 2, 1971

3,567,743
NOVEL EPOXY ORGANIC ACIDS AND
DERIVATIVES
Martin Anderson, Whitstable, Kent, England, assignor to
Shell Oil Company, New York, N.Y.
No Drawing. Filed Aug. 13, 1968, Ser. No. 752,149
Claims priority, application Great Britain, Aug. 21, 1967,
38,435/67
Int. Cl. C07d 1/20, 1/22
U.S. Cl. 260—348       3 Claims

ABSTRACT OF THE DISCLOSURE

Epoxycyclohexyl pentadienoyl compounds such as 3-methyl-5-(1,2-epoxy-2,6,6-trimethylcyclohexyl)-penta - 2,4-dienoic acid, useful as plant growth regulants.

BACKGROUND OF THE INVENTION

Field of the invention

This invention relates to novel epoxycyclohexyl pentadienoyl compounds.

SUMMARY OF THE INVENTION

It has now been discovered that certain novel epoxycyclohexyl pentadienoyl compounds exhibit plant growth regulant activity. These compounds may be used not only as herbicides but also may be used in pre- and post-emergence treatment of seeds and plants to increase the fruit yield of treated seeds or plants or to reduce shoot growth and thereby induce increased yield of other plant tissue.

The compounds can be described by the formula

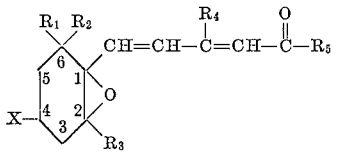

(I)

wherein $R_1$, $R_2$ and $R_3$ each are hydrogen or alkyl; $R_4$ is hydrogen, alkyl or haloalkyl; $R_5$ is hydroxy, alkoxy, monoalkylamino, dialkylamino, aryloxy or heterocyclic amino; and X is hydrogen or alkoxy.

Compounds of the invention are illustrated by and include:

3-ethyl-5-(1,2-epoxy-2-n-propyl-6-methcyclohexyl)-penta-2,4-dienoic acid, isopropyl ester;
3-(2,2-dichloroethyl)-5-(1,2-epoxy-6,6-di-n-butylcyclohexyl)-penta-2,4-dienoic acid, naphthyl ester;
5-(1,2-epoxy-2-ethyl-4-n-propoxycyclohexyl)-penta-2,4-dienoic acid, N-pyrazolide;
3-(3,3,3-tribromopropyl)-5-(1,2-epoxycyclohexyl)-penta-2,4-dienoic acid, tert-butyl ester;
3-trichloromethyl-5-(1,2-epoxy-2-n-butyl-4-ethoxycyclohexyl)-penta-2,4-dienoic acid, 2,5-dimethylphenyl ester;
5-(1,2-epoxy-6-ethyl-4-isobutoxy-cyclohexyl)-penta-2,4-dienoic acid, N-n-propylamide;
3-n-butyl-5-(1,2-epoxy-2-methyl-6-ethylcyclohexyl)-penta-2,4-dienoic acid, N-diethylamide.

This invention accordingly is the novel class of epoxycyclohexyl pentadienoyl compounds, their use as plant growth regulants and plant growth regulant compositions.

DESCRIPTION OF THE PREFERRED EMBODIMENTS

In the above formula when $R_1$, $R_2$, $R_3$ and $R_4$ are alkyl, they suitably contain 1-4 carbon atoms, i.e., methyl, ethyl, propyl, isopropyl, butyl, isobutyl, sec-butyl and tert-butyl, although methyl is preferred.

When $R_4$ is haloalkyl, the halogen suitably may be fluorine, chlorine and bromine, although fluorine is preferred and the alkyl moiety may be of 1-4 carbon atoms with methyl being preferred. The number of halogen substituents may range from 1 to a plurality preferably 1-3 halogen substituents. The halomethyl group is preferred in which the number of halogens may range from 1-3, with trihalomethyl being preferred.

When $R_5$ is alkoxy, monoalkylamino or dialkylamino, suitably the alkyl moieties may contain 1-4 carbon atoms but methyl and ethyl are preferred. When $R_5$ is aryloxy it suitably contains 6-10 carbon atoms including phenoxy and naphthoxy and alkyl-substituted phenoxy such as methylphenoxy, dimethylphenoxy, ethylphenoxy, and the like but particularly unsubstituted phenoxy. When $R_5$ is heterocyclic amino, the ring or rings suitably may each contain 5 or more atoms bonded by way of one of the nitrogen atoms to the indicated carbonyl carbon atom. Preferably the ring or rings each contain 5 or 6 atoms of which 1-2 atoms are nitrogen as the sole hetero atom such as in pyrazolyl, imidazolyl, indolyl and indazolyl. Particularly preferred is the single ring heterocyclic amino imidazolyl.

When X is alkoxy, the alkyl moiety may suitably contain 1-4 carbon atoms although methoxy is preferred.

Compounds of the preferred class include 3-methyl-5-(1,2-epoxy-2,6,6-trimethylcyclohexyl)-penta-2,4-dienoic acid;
3-methyl-5-(1,2-epoxy-2,6,6-trimethyl-4-methoxycyclohexyl)-penta-2,4-dienoic acid, ethyl ester;
3-methyl-5-(1,2-epoxy-2,6,6-trimethylcyclohexyl)-penta-2,4-dienoic acid, phenyl ester.

It will be readily appreciated that the compounds having the above general formula may exist as geometric isomers having cis and trans configuration with respect to the double bonds of the pentadienoic acid carbon chain. Also, there may be at least one asymmetric carbon atom present and hence the possibility of stereoisomerism exists. The general formula has been drawn without reference to steric configuration and is to be construed as covering all geometric isomers. Similarly, the formula is envisaged as including the individual steroisomers and mixtures, racemic or otherwise, thereof.

Compounds of the invention may be prepared by the methods set forth below. Compounds wherein $R_4$ of Formula I is alkyl may be prepared by using as the starting material the appropriately substituted compound of the formula

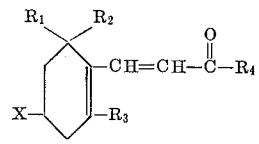

(II)

wherein $R_1$, $R_2$, $R_3$ and X are defined as for Formula I. First, the cyclohexene ethylenic double bond is oxidized to a 1,2-epoxy, conveniently by reacting with a per-acid, preferably an aromatic per-acid such as per-benzoic acid.

Second, an alkoxycarbonylmethyl group is added to the side chain by replacement of the ketonic oxygen atom. This is conveniently carried out by reacting the ketone with the carbanion formed by treating a trialkyl phosphonoacetate (in which the alkyl moiety corresponds to the alkyl moiety of $R_5$ of Formula I) with an alkali metal hydride, since this reagent will yield the desired $\alpha$ unsaturated acid product directly. This product is an alkyl ester, i.e. $R_5$ is an alkoxy.

The compound wherein $R_5$ is hydroxy is readily obtained by saponification, conveniently by refluxing the ester in a solution of an alkali metal hydroxide, for example an ethanolic sodium or potassium hydroxide solution.

The process just described yields a mixture of 2-trans and 2-cis isomers of the desired product in which the trans isomer predominates. If the cis isomer is the desired product, this is most readily obtained by submitting the trans/cis mixture to ultra-violet irradiation, thereby increasing the proportion if cis isomer, and then separating the cis isomer by fractional crystallization. If the final product desired is a cis acid, this may be obtained either by irradiating the mixture of cis and trans esters produced as described above and then saponifying the product, or alternatively by saponifying the mixture of esters to form a mixture of cis and trans acids, and then irradiating the acid mixture to increase the proportion of cis acid.

The compound wherein $R_5$ is mono- or di-alkyl amino may be prepared by reacting the appropriate ester with the mono- or di-alkyl amine. Where $R_5$ is cyclic amino, the compound is conveniently obtained by reacting the cyclic amine with the corresponding acid. Where $R_5$ is aryloxy, the compounds are obtained by reacting the appropriate cyclic amide with the alkali metal, suitably sodium, aryloxide.

Compounds wherein $R_4$ of Formula I is haloalkyl or hydrogen may be prepared by reacting a 3-haloalkyl-4-halobut-2-enoic ester or 4-halo-but-2-enoic ester respectively with the appropriately substituted cyclohexenal

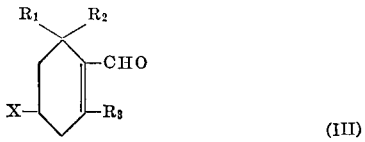

(III)

wherein $R_1$, $R_2$, $R_3$ and X are as defined for Formula I. The cyclohexene ethylenic double bond is then oxidized and there resulting lactone is hydrolyzed to the compound wherein $R_5$ of Formula I is hydroxy, i.e., the hydrolysis product is an acid. The procedures set forth below for Formula II may then be used to convert this acid to the acid derivatives of the invention, first by converting the acid to the ester by conventional esterification techniques where necessary.

As indicated above, the compounds are biologically active, and are of particular interest for their plant growth-regulant activity. It is rarely practicable, or desirable, to apply the compounds directly onto seeds or plants, and accordingly the invention includes within its scope plant growth regulant compositions comprising at least one cyclohexyl pentadienoic acid or derivative thereof as defined above in association with a carrier, or a surface-active agent, or both a carrier and a surface-active agent.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the material usually applied in formulating pesticides may be used as carrier.

Examples of suitable solid carriers are silicates, clays, for example, kaolinite clay, synthetic hydrated silicon oxides, synthetic calcium silicates, elements such as for example, carbon and sulfur, natural and synthetic resins such as for example, coumarone resins, rosin, copal, shellac, dammar, polyvinyl chloride and styrene polymers and copolymers, solid polychlorophenols, bitumen, asphaltite, waxes such as for example, beeswax, paraffin wax, montan wax and chlorinated mineral waxes, and solid fertilizers, for example superphosphates.

Examples of suitable fluid carriers are water, alcohols, such as for example, isopropanol, ketones such as for example, acetone, methyl ethyl ketone, methyl isobutyl ketone and cyclohexanone, ethers, aromatic hydrocarbons such as for example, benzene and toluene, petroleum fractions such as for example, kerosene, chlorinated hydrocarbons, such as for example, carbon tetrachloride, including liquefied normally vaporous gaseous compounds. Mixtures of different liquids are often suitable.

The surface-active agent may be a wetting agent, an emulsifying agent or a dispersing agent; it may be non-ionic or ionic. Any of the surface-active agents usually applied in formulating herbicides or insecticides may be used. Examples of suitable surface-active agents are the sodium or calcium salts of palyacrylic acids, the condensation products of fatty acids or aliphatic amines or amides containing at least 12 carbon atoms in the molecule with ethylene oxide and/or propylene oxide; partial esters of the above fatty acids with glycerol, sorbitan, sucrose and pentaerythritol; condensation products of alkyl phenols, for example p-octylphenol or p-octylcresol, with ethylene oxide and/or propylene oxide; sulfates or sulfonates of these condensation products; and alkali metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The compositions of the invention may be formulated as wettable powders, dusts, granules, solutions, emulsifiable concentrates, emulsions and pastes. Wettable powders are usually compounded to contain 25, 50, or 75% of toxicant and usually contain, in addition to solid carrier, 2–10% of a dispersing agent and, where necessary, 0–10% of stabilizers and/or other additives such as penetrants or stickers. Dusts are usually formulated as a dust concentrate having a similar composition to that of a wettable powder but without a dispersant, and are diluted in the field with further solid carrier to give a composition usually containing ½–10% of toxicant. Granules are usually prepared to have a size between 10 and 100 BS mesh, and may be manufactured by agglomeration or impregnation techniques. Generally, granules will contain ½–25% toxicant and 0–25% of additives such as stabilizers, slow release modifiers, binding agents etc. Emulsifiable concentrates usually contain, in addition to the solvent and, when necessary, co-solvent, 10–50% w./v. toxicant, 2–20% w./v. emulsifiers and 0–20% of appropriate additives such as stabilizers, penetrants and corrosion inhibitors. Pastes are compounded so as to obtain a stable, flowable product and usually contain 10–60% toxicant, 2–20% of appropriate additives and, as carrier, water or an organic liquid in which the toxicant is substantially insoluble.

The compositions of the invention may contain other ingredients, for example, protective colloids such as gelatin, glue casein, gums and polyvinyl alcohol; sodium polyphosphates; cellulose ethers, stabilizers such as ethylene diamine tetra-acetic acid; other herbicides or pesticides; and stickers, for example non-volatile oils.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The compounds according to the invention, and compositions containing them, may be used as plant growth regulants to modify the growth of plants or plant structures. These uses may be of considerable economic importance, the effect produced depending, among other things, upon the time of application, the concentration used, the species of plant and the point of application, and may be grouped broadly into those uses obtained from pre-emergence application and those obtained from post-emergence application.

Thus, in pre-emergence application the compounds, or compositions containing them, may be applied to roots, seeds, bulbs, corms, rhizomes or tubers before planting, or the compounds may be applied to the soil before or after planting the crop. Applied in this way the compounds and their compositions may be used as herbicides, either alone or in combination with other herbicides, or to delay the germination of seeds or the sprouting of plant storage organs. Induced delay in seed germination can be of especial importance in preventing premature germination in semi-arid zones where the seeds are sown just before expected rains. Also they can permit the use of less selective pre-emergence herbicides, and in contrast with many known preemergence herbicides the compounds of the invention persist for only a very short time in the soil which confers a freedom of rotational cropping which is not possible with persistent herbicides. Another important effect of treating seeds is that fruit yield of plants grown from such treated seeds is often increased. This aspect of seed treatment can be of particular value in cereal crops where the yield of grain may be increased; this enhanced yield can arise both from an increase in the weight of individual grain seeds and/or an actual increase in the number of grain seeds.

Seeds and other plant storage organs may be treated by a variety of methods such as liquid soaking, spraying using solutions, dispersions or emulsions of the growth regulant, or dry seed coating.

The amount of the active compound necessary to produce the growth-regulating effects will vary depending upon the type of seed or other organ treated, the growth-regulating effect desired, the particular growth-regulating compound, the intimacy of contact of the active compound with the seed, duration of contact in some cases, and the like. The amount may range from 0.5 part per million (p.p.m.) or less up to 30 p.p.m. or more of accumulated growth-regulant based upon the storage weight of, for example, wheat seeds. The range may vary widely for optimum results with other crops. Expressed as a concentration based upon a liquid or solid carrier, concentrations as low as 1 p.p.b. (part per billion) and as high as 50% by weight (w.) may be used. Generally, at least 1 p.p.m. will be used and seldom are concentrations greater than 10% w. necessary. Solid cariers generally require higher concentrations than the liquid carriers.

Soaking the seeds and other plant storage organs with a solution of the growth-regulant is generally an excellent method of intimately contacting the organs with the growth-regulant. The duration of soaking may vary widely and the maximum time depends upon the ability of the seeds and other organs to remain viable in the particular liquid.

The quantity of growth-regulant necessary in pre-emergence application to the soil will depend upon factors such as the method of application, formulation or composition used, soil conditions, type of seed or other plant storage organ to be affected, the particular growth-regulating compound and the like and will generally be greater than with seed treatment because intimacy of contact is less.

In post-emergence application the compounds are applied to the aerial parts of growing plants. This includes application to mature trees and bushes in addition to recently-emerged seedlings and established crops. Post-emergence uses for the compounds include the stimulation and delay of flowering; the delay of bud burst and the effect on flower drop; defoliation and the effect on leaf senescence; the effect on fruit ripening and the retardation of shoot growth. The defoliating effect of the compounds can be of particular importance in the defoliation of cotton plants and the use of the compounds for this purpose, either alone or in admixture with known defoliants, is a feature of the invention. The effect of the compounds in retarding shoot growth can be of particular importance in those instances where reduced shoot growth is accompanied by increased yield of another plant tissue or product.

A commercially important aspect of this effect is the reduction of shoot growth in sugar-cane to increase the yield of sugar per unit weight of cane shoot, and the use of the compounds of the invention for this purpose is a further feature of the invention. The quantity of growth-regulant compound needed to effectively increase the sugar content of sugar cane will vary widely with the type of formulation or composition, method of application, environmental conditions, etc. The quantity of growth-regulant may range from as low as 15 milligrams or less per shoot of sugar cane to 100 milligrams or more per shoot. The optimum amount will obviously vary under particular field conditions.

Since the effect of the growth-regulant upon the shoot will vary according to the time period during its growing cycle when the regulant is applied, in order to optimize the increase in sugar content, application 2–3 months prior to expected harvest is generally desirable, but application as late as four weeks prior to the expected harvest may show some increase in sugar content.

The effect of the compounds in inducing leaf senescence can be of particular value in, for example, the cultivation of Brussels sprouts and tobacco. A further feature of the invention is the physiological effect of the compounds or their compositions on fruit ripening. Thus accelerated ripening may be induced in cotton, olives, vines and citrus fruits. In this aspect the low mammalian toxicity of the derivatives and their low residues in fruit at harvesting is of particular importance.

Since the growth-regulant compounds of the invention are hormone-type materials similar in effect to compounds naturally-occurring at times in the plants, the plant inevitably possesses a natural biochemical system for the deactivation and removal of the compounds. The natural removal process can be counteracted either by repeated treatments or by use of a slow release formulation. Slow release formulations make the compounds continually available to the plant over an extended period and are particularly useful when the desired effect of the regulant is to continue over a significant portion of the growing cycle of the season during which application is made.

Resolution of the various factors which will affect achievement of optimum results in the use of the compounds of the invention may be readily accomplished by those versed in the use of plant-regulants.

The use of the compounds and their compositions in the control of freshwater and marine growths such as water hyacinth and algae is also contemplated.

The preparation of the compounds, and their use as plant growth regulants, is further illustrated in the examples which follow. In the preparative examples, parts by weight (w.) bears the same relationship to parts by volume as does the kilogram to the liter. All elemental analyses are expressed as percent by weight.

EXAMPLE I

Preparation of 3 methyl-5-(1,2-epoxy-2,6,6-trimethyl-cyclohexyl)-penta-2,4-dienoic acid, ethyl ester Redistilled 4-(2,6,6-trimethylcyclohex-1-en-1-yl)-but-3-en-2-one (93 parts v., 87.8 parts w.) was added dropwise over 10 minutes to a solution of perbenzoic acid (63.2 parts w.) in chloroform (1760 parts v.) at 0° C. After standing at 5–10° C. for 66 hours the reaction was complete (as determined by starch/iodide reaction). The benzoic acid was extracted with 10% sodium hydroxide solution (3× 200 parts v.) and the chloroform solution was then shaken with water until the washings were neutral. The chloroform solution was then dried, evaporated and the colorless residue distilled under reduced pressure to yield 4-(1,2-epoxy-2,6,6-trimethylcyclohex-1-en-1-yl)-but-3-en-2-one as a colorless oil (B.P. 87–88° C/0.6 torr) which crystallized completely on cooling (M.P. 48–50° C.).

Triethylphosphonoacetate (41 parts v., 46.0 parts w.) was added dropwise to a stirred suspension of sodium hydride (4.8 parts w., as a 50% slurry washed free of oil with dry petrol), in anhydrous tetrahydrofuran (250 parts v.). After one hour at 15–20° C. the solution was not completely clear and a further amount of phosphonoacetic ester (1–2 parts v.) was added. Hydrogen was evolved, and after an hour a solution of 4-(1,2-epoxy-2,6, trimethylcyclohex-1-en-1-yl)-but-3-en-2-one (41.6 parts w., obtained as described above) in dry tetrahydrofuran (50 parts v.) was added over a period of 20 minutes. The solution became brownish and the temperature of the reaction rose from 20° C. to 27° C. After 18 hours at room temperature the reaction mixture was briefly warmed to 40° C., allowed to cool slowly (4 hours) and the tetrahydrofuran removed under reduced pressure. The residue was diluted with water, extracted twice with ether (500,300 parts v.) and the extract washed with water (200 parts v.) and dried. Evaporation of the dried extract followed by distillation of the residue yielded the desired product as a colorless liquid (B.P. 117°–120°/0.2 torr). GLC and NMR analysis of the product showed that the ratio of trans and cis isomers was 85:15.

*Analysis.*—Calculated for $O_3C_{17}H_{26}$ (percent): C, 73.3; H, 9.4. Found (percent): C, 73.1; H, 9.8.

EXAMPLE II

Preparation of 3-methyl-5-(1,2-epoxy-2,6,6-trimethylcyclohexyl)-penta-2,4-dienoic acid The ethyl ester obtained in Example I above (30 parts w.) was refluxed with ethanolic potassium hydroxide (45 parts w. KOH/300 parts v. $H_2O$/150 parts v. ethanol) for 3½ hours. The resulting clear solution was cooled, extracted with ether (200 parts v.) and acidified with concentrated hydrochloric acid to a pH of 3. The oily acid was then extracted into ether (3× 500 parts v.) and the ether extract dried and evaporated to leave a pale yellow oil, which crystallized on standing. This material was recrystallized from ether/petroleum ether (60–80°) to give the desired product, M.P. 104–106° C.

*Analysis.*—Calculated for $O_3C_{15}H_{22}$ (percent): C, 72.0; H, 8.9. Found (percent): C, 72.1; H, 9.1.

EXAMPLE III

Conversion of trans form into cis form

The solution of the trans ethyl ester (prepared in Example I) (5.5 parts w.) in dry acetone (200 parts v., previously refluxed for 2 hours under nitrogen) was irradiated for 4 hours with a 70 watt, immersion type, high pressure ultra-violet lamp ("Quartzlampen" Q81). The solution was stirred magnetically and the apparatus flushed with nitrogen throughout the reaction. Removal of the acetone under reduced pressure followed by evacuation to 0.05 torr for 4 hours gave a product which was shown by gas liquid chromatography to be mainly a mixture of cis isomer (47%) and trans isomer (47.5%).

EXAMPLE IV

Preparation of cis acid

The ester mixture obtained in Example III (5.5 parts w.) was dissolved in ethanol/water (25 parts v./50 parts v.) containing potassium hydroxide (8 parts w.). The mixture was then heated and refluxed for 1½ hours, cooled (ice-water) and shaken with ether (60 parts v.). The pale yellow solution was then acidified (with hydrochloric acid) and extracted with ether (3× 100 parts v.). After drying over magnesium sulfate, the ether solution was evaporated under reduced pressure to leave a residue which was dissolved in ether/petroleum ether (60–80°), and the solution then concentrated by boiling off the ether. On cooling to room temperature white crystals of the desired product formed, M.P. 144–145° C.

*Analysis.*—Calculated for $O_3C_{15}H_{22}$ (percent): C, 72.0; H, 8.9. Found (percent): C, 71.8; H, 9.0.

EXAMPLE V

Alternative preparation of cis acid

The trans-epoxy acid obtained in Example II (15 parts w.) was dissolved in dry acetone (850 parts v.; saturated with nitrogen) and irradiated as described in Example III for 8 hours. The apparatus was continually flushed with nitrogen and the solvent began to reflux about 20 minutes after the start of irradiation. After cooling the solvent was removed under reduced pressure and the residue crystallized from petroleum ether (60–80°). The first crop of crystals (4.7 parts w.; 65% yield based on recovered starting material) was cis acid of good purity, while subsequent crops of crystals consisted almost entirely of the trans acid.

EXAMPLE VI

Preparation of 3-methyl-5-(1,2-epoxy-2,6,6-trimethylcyclohexyl)-penta-2,4-dienoic acid, methyl ester The cis-epoxy acid obtained in Example V (1.0 part w.) was suspended in dry ether (10 parts v.) and an excess of ethereal diazomethane solution added dropwise (with cooling in ice-water). After 1 hour at room temperature, the solution was evaporated under reduced pressure, and the colorless residue distilled to yield the desired product, B.P. 105–106° C. at 0.11 torr.

*Analysis.*—Calculated for $O_3C_{15}H_{24}$ (percent): C, 72.7; H, 9.2. Found (percent): C, 72.5; H, 9.0.

EXAMPLE VII

Preparation of 3-methyl-5-(1,2-epoxy-2,6,6-trimethylcyclohexyl)-penta-2,4-dienoic acid, N-methyl amide The corresponding methyl ester (0.406 part w., obtained as in Example VI) was dissolved in ethanolic methylamine solution (25 parts v.; 33% w./v.) and left for one week at room temperature. After this time the methylamine solution was removed under vacuum and replaced by an equal volume of fresh ethanolic methylamine solution. After a further five days the solvent was removed under vacuum to leave a crystalline residue, which was recrystallized from ether/petrol (60–80° C.) to yield the desired product having an M.P. 147–148° C.

*Analysis.*—Calculated for $C_{16}H_{25}NO_2$ (percent): C, 73.0; H, 9.6; N, 5.3. Found (percent): C, 72.8; H, 9.6; N, 5.2.

EXAMPLE VIII

Preparation of 3-methyl-5-(1,2-epoxy-2,6,6-trimethylcyclohexyl)-penta-trans - 2 - trans-4-dienoic acid, N-imidazolide The acid corresponding to the desired product (5.0 parts w., obtained as in Example II) was added to a solution of N,N'-carbonyldiimidazole (3.92 parts w.) in dry tetrahydrofuran (70 parts v.) and the mixture stirred for two hours under dry nitrogen. The solution was then filtered and evaporated to yield a residue of imidazole, and the mother liquors then further evaporated to yield a crystalline residue of the desired product. After recrystallization from ether/petrol (60–80°) the desired product was obtained having an M.P. 100–102°.

*Analysis.*—Calculated for $C_{18}H_{24}N_2O_2$ (percent): C, 72.0; H, 8.05; N, 9.3. Found (percent): C, 72.3; H, 8.1; N, 9.2.

EXAMPLE IX

Preparation of 3-methyl-5-(1,2-epoxy - 2,6,6 - trimethyl-cyclohexyl)-penta-trans-2-trans-4-dienoic acid, phenyl ester The appropriate imidazolide (1.0 part w., prepared as in Example VIII) was added to a solution of sodium phenoxide in phenol (about 0.02 part w. sodium dissolved in 10.0 parts w. phenol) at 90° C. The resulting solution was then stirred at 80–85° C. under nitrogen for 3½ hours and left at 50–55° C. for 17 hours. The reaction mixture was then cooled, diluted with ether, and the ether solution washed with 5% aqueous sodium hydroxide (2× 100 parts v.) followed by water until the washings were neutral. After drying the extract, the ether was evaporated off and the desired product obtained as a residue which, after recrystallization from petroleum/ether (60–80°) had an M.P. 86–87° C.

*Analysis.*—Calculated for $C_{21}H_{26}O_3$ (percent): C, 77.3; H, 8.0. Found (percent): C, 77.3; H, 7.9.

EXAMPLE X

Preparation of 3-methyl-5-(1,2-epoxy - 2,6,6 - trimethyl-cyclohexyl)-penta-cis-2-trans - 4 - dienoic acid, phenyl ester A solution of N,N'-carbonyldiimidazole (0.79 part w.) in dry tetrahydrofuran (25 parts v.) was added to the appropriate epoxy acid (1.0 part w., prepared as in Example IV) and the resulting solution stirred at room temperature under nitrogen for 6 hours. The solution was then diluted with ether (150 parts v.) and washed with 5% sodium hydroxide solution (2× 100 parts v.) followed by water. The dried ether extract, upon evaporation yielded an oily residue which could not be crystallized. This residue was dissolved in molten phenol (10 parts w.) in which a small amount (about 0.05 part w.) of sodium had been dissolved, and the resultant solution was kept at 75–80° C. for 24 hours under nitrogen. This solution was worked up as in Example IX to yield the desired phenyl ester as a pale yellow oil. This product contained 12% trans isomer (as calculated from NMR measurements). The pure cis isomer, M.P. 64–65°, was obtained by chromatographic separation on a silica column using ether/petroleum ether as eluent. The structure of the final product was confirmed by the NMR spectrum.

*Analysis.*—Calculated for $C_{21}H_{26}O_3$ (percent): C, 77.3; H, 8.0. Found (percent): C, 77.2; H, 8.3.

EXAMPLE XI

Preparation of 3-methyl-5-(1,2-epoxy - 4 - methoxy-2,6,6-trimethyl-cyclohexyl)-penta-2,4-dienoic acid, ethyl ester 4 - (2,6,6 - trimethyl - 4 - methoxy-1-cyclohexen-1-yl)-3-buten-2-one (15 parts w.) was dissolved in chloroform and added dropwise to a solution of perbenzoic acid (10.3 parts w.) in chloroform (580 parts w.) at 0–5° C. with stirring. After standing at 0–15° C. for 4 days the mixture was shaken with 10% sodium hydroxide solution, followed by water until the washings were neutral. The chloroform layer was dried over magnesium sulfate, filtered, evaporated and finally distilled under reduced pressure to yield the desired intermediate, 4-(1,2-epoxy-4-methoxy-2,6,6-trimethyl-cyclohexyl) - 3 - buten-2-one, B.P. 102° C./0.15 mm.

This intermediate was dissolved in tetrahydrofuran (100 parts v.) and added dropwise to the solution obtained by the dropwise addition of triethyl phosphonoacetate (11.9 parts w.) in tetrahydrofuran (25 parts v.) to a stirred suspension of sodium hydride (1.16 parts w.) in tetrahydrofuran (50 parts v.), the temperature being kept below 30° C. After standing overnight, the tetrahydrofuran was evaporated off and water added. The mixture was then extracted with ether, and the combined extracts dried over magnesium sulfate, filtered, evaporated and finally distilled under reduced pressure to yield the desired product, 3-methyl - 5 - (1,2-epoxy-4-methoxy-2,6,6-trimethyl-cyclohexyl)-penta-2,4-dienoic acid, ethyl ester, B.P. 128–132° C./0.1 mm.

*Analysis.*—Calculated for $O_4C_{16}H_{26}$ (percent): C, 70.2; H, 9.1. Found (percent): C, 70.2; H, 9.3.

EXAMPLE XII

Preparation of 3-trifluoromethyl-5-(1,2-epoxy-2,6,6-trimethylcyclohexyl)-penta-2,4-dienoic acid 4-bromo-3-trifluoromethyl-but - 2 - enoic acid, methyl ester (9 parts w.) was added dropwise to a stirred mixture of 2,6,6-trimethylcyclohex-1-en-1-al (4.25 parts w.) in dry tetrahydrofuran (10 parts v.) and etched chopped zinc wool (2.65 parts w.) at 70° C. under nitrogen. After 5 minutes reaction commenced and the mixture was then refluxed for 45 minutes and allowed to cool overnight. The solution was then shaken with 10% ammonium chloride solution, extracted with ether, and the combined ether extracts dried and evaporated. Unreacted 2,6,6-trimethylcyclohex-1-en-1-al was removed by distillation under reduced pressure to yield a residue which was purified chromatographically on a silica column to yield the δ lactone of 3-trifluoromethyl-5-hydroxy-5-(2,6,6-trimethylcyclohex-1-en-1-yl)-pent-2-enoic acid.

This lactone product (2.2 parts w.) was dissolved in chloroform (200 parts v.) and perbenzoic acid solution (36 parts w. of a 4.35% w./v. solution) was added to the solution cooling to 0–5°. The mixture was kept at about 0° C. for 5 days with occasional shaking, and then shaken with 10% sodium hydroxide and washed with water until neutral. After drying the solution was evaporated to yield an oil which crystallized on standing to yield the δ lactone of 3-trifluoromethyl-5-hydroxy-5-(1,2-epoxy-2,6,6-trimethylcyclohexyl)pent-2-enoic acid.

The epoxy lactone (0.1 part w.) was then dissolved in ethanol (1 part v.) containing sodium (0.02 part w.) and stirred for 24 hours. The mixture was then poured into 10% phosphoric acid solution and extracted with ether. The ether extracts were dried and the product separated by preparative thin layer chromatography to yield the desired product 3-trifluoromethyl-5-(1,2-epoxy-2,6,6-trimethylcyclohexyl)-penta-2,4-dienoic acid having an M.P. of 74–84° C. The structure of the product was confirmed by the NMR spectrum.

EXAMPLE XIII

Herbicidal activity

To demonstrate their herbicidal activity, the compounds of the invention were tested using, as a representative range of plants: oat (O; *Avena sativa*), ryegrass (RG; *Lolium perenne*), linseed (L; *Linum usitatissimum*), and mustard (M; *Sinapis alba*). The seeds of these plant species were sown and allowed to germinate in steam-sterilized John Innes compost.

The tests fall into two categories, pre-emergence and post-emergence tests. The pre-emergence tests involve the spraying of a liquid formulation of the compound onto the soil in which the seeds of the plant species mentioned above have recently been sown. The post-emergence tests involved foliar spray tests in which seedling plants were sprayed with such a formulation.

The formulations used in these tests consisted of 50 parts by volume of acetone, 50 parts by volume of water, 0.5 part by weight of an alkylphenol/ethylene oxide condensate available under the trade name Triton X–155, and a compound of the invention in varying amounts.

In the soil spray and foliar spray tests two dosage levels, equivalent to 10 and 1 kilograms of active material per hectare respectively were applied in a volume equivalent to 606 liters per hectare.

The herbicidal effects of the compounds concerned were assessed visually seven days after spraying the foliage (post-emergence test) and eleven days after spraying the soil (pre-emergence test), and were recorded on a 0–9 scale (0=no effect and 9=very strong herbicidal effect). A rating of 2 approximately corresponds to a reduction in fresh weight of stem and leaf of the treated plants of 25%, a rating of 5 approximately corresponds to a reduction in weight of 55%, a rating of 9 to a reduction in weight of 95%, etc. The results of these tests are shown in the following Table I, in which the compounds are identified by reference to the substituents on the formula:

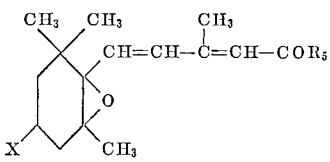

TABLE I

| Compound | | | Dosage, kg./ha. | Growth inhibition | | | | | | | |
|---|---|---|---|---|---|---|---|---|---|---|---|
| | | | | Foliar spray, plants | | | | Soil spray, seeds | | | |
| X | R₅ | Isomer | | O | RG | L | M | O | RG | L | M |
| H | OH | Cis | 10 | 1 | 0 | 6 | 2 | 8 | 9 | 9 | 9 |
| | | | 1 | 0 | 0 | 1 | 0 | 2 | 7 | 3 | 6 |
| H | OH | Trans | 10 | 0 | 0 | 3 | 5 | 3 | 4 | 5 | 5 |
| | | | 1 | | | 0 | 0 | 0 | 0 | 0 | 0 |
| H | OCH₃ | Cis | 10 | 3 | 2 | 7 | 2 | 9 | 9 | 9 | 9 |
| | | | 1 | 0 | 0 | 1 | 0 | 3 | 0 | 0 | 0 |
| H | OC₂H₅ | Trans | 10 | 0 | 0 | 3 | 3 | 0 | 0 | 0 | 0 |
| | | | 1 | | | 0 | 0 | | | | |
| H | OC₂H₅ | Mixture | 10 | 1 | 1 | 7 | 2 | 9 | 8 | 6 | 9 |
| | | | 1 | 0 | 0 | 0 | 0 | 1 | 2 | 4 | 8 |
| H | OC₆H₅ | Cis | 10 | 0 | 0 | 5 | 2 | 0 | 2 | 0 | 0 |
| | | | 1 | | | 0 | 0 | | 0 | | |
| CH₃O | OC₂H₅ | Mixture | 10 | 4 | 2 | 7 | 3 | 9 | 8 | 7 | 8 |
| | | | 1 | 0 | 0 | 1 | 0 | 1 | 4 | 6 | 8 |

EXAMPLE XIV

Inhibition of germination of seeds by compounds of the invention

Solutions of the test compounds were prepared by dissolving samples in phosphate buffer containing 1% acetone and subsequently making serial dilutions of these stock solutions. Linseed (variety Lapwing) seeds were incubated with these solutions in darkness at 22° C. After 2 days, corresponding to complete germination of untreated seeds, the number of seeds germinated at each concentration of the compounds was scored and this value plotted against the concentration of the compounds using a log probit scale. The concentration of compounds required to inhibit germination in half the seeds ($GIC_{50}$) was then calculated for each compound. The results obtained in this experiment are given in Table II.

Table II

| Compound: | $GIC_{50}$ (two days), M |
|---|---|
| 3-methyl-5-(1,2-epoxy-2,6,6-trimethylcyclohexyl)-penta-cis-2-trans-4-dienoic acid | $1.35 \times 10^{-5}$ |
| 3-methyl-5-(1,2-epoxy-2,6,6-trimethylcyclohexyl)-penta-cis-2-trans-4-dienoic acid, methyl ester | $1.30 \times 10^{-5}$ |
| 3-methyl-5-(1,2-epoxy-2,6,6-trimethylcyclohexyl)-penta-cis-2-trans-4-dienoic acid, phenyl ester | $0.95 \times 10^{-5}$ |

I claim as my invention:
1. The compound of the formula:

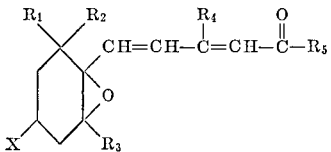

wherein $R_1$, $R_2$ and $R_3$ each are methyl; $R_4$ is methyl or trifluoromethyl; $R_5$ is hydroxy, methoxy, ethoxy, methylamino, phenoxy or imidazolyl and X is hydrogen or methoxy.

2. The compound of claim 1 wherein $R_4$ is methyl, $R_5$ is hydroxy, methoxy or ethoxy and X is hydrogen.

3. The compound of claim 2 wherein $R_5$ is hydroxy.

No references cited.

NORMA S. MILESTONE, Primary Examiner

U.S. Cl. X.R.

71—88 92, 96; 260—309, 310, 326.13